United States Patent [19]

Baker et al.

[11] Patent Number: 5,678,041

[45] Date of Patent: Oct. 14, 1997

[54] SYSTEM AND METHOD FOR RESTRICTING USER ACCESS RIGHTS ON THE INTERNET BASED ON RATING INFORMATION STORED IN A RELATIONAL DATABASE

[75] Inventors: Brenda Sue Baker; Eric Grosse, both of Berkeley Heights, N.J.

[73] Assignee: AT&T, Middletown, N.J.

[21] Appl. No.: 519,268

[22] Filed: Aug. 25, 1995

Related U.S. Application Data

[63] Continuation-in-part of Ser. No. 469,276, Jun. 6, 1995, abandoned.

[51] Int. Cl.$^6$ ............................................... G06F 17/30
[52] U.S. Cl. .......................... 395/609; 395/601; 395/610; 395/188.01
[58] Field of Search .................................. 395/600, 726, 395/739, 188.01, 187.01, 609, 610, 601

[56] References Cited

U.S. PATENT DOCUMENTS 4,961,224   10/1990   Yung ........................................... 380/25
5,113,499    5/1992   Ankney et al. .......................... 340/825.34

OTHER PUBLICATIONS

Jay Friedland, "Surfwatch Blocks Internet Pronography, Breaktrough Product Ships Today"; obtained at the internet address http://www.surf.com May 15, 1995.

Albert Lunde, "Parental Control: A Proposed Addition to HTTP"; obtained through internet newsgroup article 1060 of comp.infosystems.www.servers.unix May 29, 1995.

*The Little Schoolhouse Logs On*, PC Magazine, Feb. 21, 1995, p. 62.

*The Rating Game*, Stanford Observer, Winter 1995, p. 13.

Surf–Watch World Wide Web Homepage, copyright 1995 SurfWatch Software, Inc.; obtained at the Internet address http://www.surfcom/index.html on Jun. 6, 1995.

*Re: Parental Control: A Proposed Addition to HTTP*, Albert Lunde, Article 1060 of comp.infosystems.www.servers.unix newsgroup on the World Wide Web, May 29, 1995.

*Primary Examiner*—Thomas G. Black
*Assistant Examiner*—Greta L. Robinson
*Attorney, Agent, or Firm*—Michele Conover

[57] ABSTRACT

A system and method for selectively controlling database access by providing a system and method that allows a network administrator or manager to restrict specific system users from accessing information from certain public or otherwise uncontrolled databases (i.e., the WWW and the Internet). The invention employs a relational database to determine access rights, and this database may be readily updated and modified by an administrator. Within this relational database specific resource identifiers (i.e., URLs) are classified as being in a particular access group. The relational database is arranged so that for each user of the system a request for a particular resource will only be passed on from the local network to a server providing a link to the public/uncontrolled database if the resource identifier is in an access group for which the user has been assigned specific permissions by an administrator. In one preferred embodiment, the invention is implemented as part of a proxy server within the user's local network.

23 Claims, 6 Drawing Sheets

FIG. 4

DOCUMENT TITLE:
DOCUMENT URL:

NV

TO SEE THE JUSTIFICATION GIVEN FOR THE EXISTING RATING, CLICK HERE.
IF YOU DISAGREE, CLICK HERE.

800 DIRECTORY

BROWSE BY CATEGORY a, b, c, d, e, f, g, h, i, j, k, l, m, n, o, p, q, r, s, t, u, v, w, x, y, z

BROWSE BY NAME a, b, c, d, e, f, g, h, i, j, k, l, m, n, o, p, q, r, s, t, u, v, w, x, y, z, 0, 1, 2, 3, 4, 5, 6, 7, 8, 9
CLICK ON A LETTER TO START BROWSING.

STRING SEARCH

[BEGIN SEARCH] [CLEAR FORM]

THE SEARCH IS CASE INSENSITIVE; BLANKS DENOTE "AND".

PHONE NUMBER SEARCH

[BEGIN SEARCH] [CLEAR FORM]

WE KNOW THAT YOUR LIFE IS BUSY, EVERY DAY. THAT'S WHY WE CREATED THE PRINTED 800 DIRECTORY TEN YEARS AGO. IT'S

*FIG. 5*

| DOCUMENT TITLE: | |
|---|---|
| DOCUMENT URL: | |

RATING: NV

TOLL-FREE TELEPHONE LISTING - ZERO VIOLENT CONTENT

*FIG. 6*

DOCUMENT TITLE:
DOCUMENT URL:

PLEASE INDICATE WHY YOU BELIEVE THE RATING SHOULD BE CHANGED ON HTTP://ATT.NET/DIR800

SUGGESTED RATING: NV
MAIN REASON: ZERO VIOLENT CONTENT
FROM:

THE RESOURCE PROVIDES A LISTING OF TOLL-FREE TELEPHONE NUMBERS THAT MAY BE SEARCHED BY INDIVIDUAL LISTING NAME OR GENERAL LISTING CATEGORY. THERE ARE NO VIOLENT GRAPHICS/TEXT WITHIN THE RESOURCE ITSELF.

[SEND MESSAGE] [START OVER]

SYSTEM AND METHOD FOR RESTRICTING USER ACCESS RIGHTS ON THE INTERNET BASED ON RATING INFORMATION STORED IN A RELATIONAL DATABASE

CROSS-REFERENCE TO RELATED APPLICATION

This is a continuation-in-part of the U.S. patent application Ser. No. 08/469,276, filed on Jun. 6, 1995 entitled "System And Method For Database Access Administration", now abandoned.

TECHNICAL FIELD

The invention relates to controlling database access and, more particularly, to selectively providing such control with respect to otherwise public databases.

BACKGROUND OF THE INVENTION

Files or other resources on computers around the world may be made publicly available to users of other computers through the collection of networks known as the Internet. The collection of all such publicly available resources, linked together using files written in Hypertext Mark-up Language ("HTML"), is known as the World Wide Web ("WWW").

A user of a computer that is connected to the Internet may cause a program known as a client to request resources that are part of the WWW. Server programs then process the requests to return the specified resources (assuming they are currently available). A standard naming convention has been adopted, known as a Uniform Resource Locator ("URL"). This convention encompasses several types of location names, presently including subclasses such as Hypertext Transport Protocol ("http"), File Transport Protocol ("ftp"), gopher, and Wide Area Information Service ("WAIS"). When a resource is downloaded, it may include the URLs of additional resources. Thus, the user of the client can easily learn of the existence of new resources that he or she had not specifically requested.

The various resources accessible via the WWW are created and maintained by many different people on computers around the world, with no centralized control of content. As particular types of information or images contained in this uncontrolled information collection may not be suitable for certain users, it may be desirable to selectively restrict access to WWW resources. For example, parents or school teachers might wish to have children access useful information, but not obscene material (which the children may be exposed to as a result of innocent exploration of the WWW, or through the incidental downloading of a URL). Another example is the case of school teachers who would like their students to access just a particular group of resources during a class meeting. A third example is businesses that would like their employees to access only work-related resources, but not to spend their time on other WWW explorations. In general, a particular user might need to be restricted to different resources at different times, as in the case of a student restricted to different sets of resources during classes on different subjects.

Some authorities such as schools ask the users to abide by a policy statement by which they agree to restrict their exploration of the WWW, for example, by agreeing not to download obscene material. However, voluntary compliance with such a policy will not prevent the accidental downloading of resources that are not readily identifiable as forbidden or inappropriate prior to downloading and viewing.

Naturally, technical solutions such as "firewalls" are also available to limit or impede access to the WWW and Internet. These firewalls are software-based gateways that are commonly installed to protect computers on a local area network ("LAN") from being attacked by outsiders. One effect of installing a firewall is that WWW clients can no longer directly contact WWW servers. Typically, this proves too restrictive, and users resort to "proxy servers" that are directly contacted by WWW clients. These proxy servers have special abilities to forward requests through the firewall, and thereby provide communication to and from servers on the Internet. For efficiency, a proxy server may also cache some resources locally. Current clients and proxy servers yield access to every public resource in the WWW—. They are not configured to allow a particular user to request some resources, while preventing access by that user to other resources.

Some "filtering" of the available WWW resources may be effected within systems that offer indirect access. In these systems an information provider would download resources from the WWW and maintain copies of the resources. Users would access these copies. The information provider can review the resources as they are obtained from the WWW, and edit out any inappropriate or obscene material prior to making the resource available to users. A disadvantage of this scheme is that the material provided by the information provider may be out-of-date compared to the original resource on the WWW.

In an alternate scheme of "filtered" access to WWW resources, a proxy server provides a user with a menu of allowed resources that may be accessed, and users can obtain any resources that can be reached by a series of links from the menu resources. The user is only permitted to request URLs via this menu. This particular method has two disadvantages. First, many resources must be excluded from the menu because they contain links to inappropriate material, even though they themselves might be acceptable. Second, a resource may change over time to include new links that might lead to inappropriate material, and thereby provide a user with an unintended pathway of access to such.

In still another method of "filtered" access to WWW resources, the client or proxy server checks each resource for a list of disallowed words (i.e.; obscenities; sexual terms, etc.) and shows the user only those resources that are free of these words. However, this method does not permit filtering of images and does not prohibit resources that might be inappropriate due to content other than specific words.

Yet another means of protecting users from inappropriate or obscene materials has been established by the computer and video game manufacturers. The games are voluntarily rated on the dimensions of violence, nudity/sex, and language. Although such conventions have not yet been adopted in the WWW, the analog would be to add such ratings to WWW resources, presumably with digital signatures to prevent forgery. A WWW client could then, if so programmed, choose not to save or display any resource that is unrated or has an unacceptable rating for the given audience. The disadvantage of this scheme is the need to convince the many people who provide useful servers (often on a non-professional or pro bono basis) to coordinate with a rating panel.

All of the present systems for limiting user access to an uncontrolled public database resources, such as those available on the WWW, have obvious shortcomings. Presently, there exists no simple means for an authority (i.e.; teacher, supervisor, system administrator, etc.) to selectively control WWW access by one or more users, without significantly impairing the users' ability to communicate with the Internet. This is especially true if the particular authority wishing to exert such control has few computer skills with respect to the management of information/services networks.

SUMMARY OF THE INVENTION

The present invention overcomes the deficiencies of prior schemes for regulating network database access by providing a system and method that allows one or more network administrators/managers to rate particular information and/or services. This rating is then employed to restrict specific system users from accessing the information/services via certain public or otherwise uncontrolled databases (i.e., the WWW and the Internet). The invention employs a relational database to determine access rights, and store rating information. The rating information database may be readily updated and modified by an administrator/manager. Within this relational database specific resource identifiers (i.e., URLs) are classified as being associated with a particular access rating. The relational database is arranged so that for each user of the system a request for a particular resource will only be passed on from the local network to a server providing a link to the public/uncontrolled database if the resource identifier has an access rating for which the user has been assigned specific permissions by an administrator/manager. In one preferred embodiment, the invention is implemented as part of a proxy server within the user's local network. In another embodiment, the system maintains a ratings resource file associated with each specific resource identifier, wherein comments, conditions, etc. relating the particular resource are stored.

BRIEF DESCRIPTION OF THE DRAWING

In the drawing:

FIG. 4 is an illustration of ratings information returned to a system manager upon retrieval of a particular network resource;

FIG. 5 is an illustration of resource categorization information provided to a network manager; and FIG. 6 is an illustration of a ratings editing page accessible by a network manager.

DETAILED DESCRIPTION OF THE INVENTION

Figure 1:
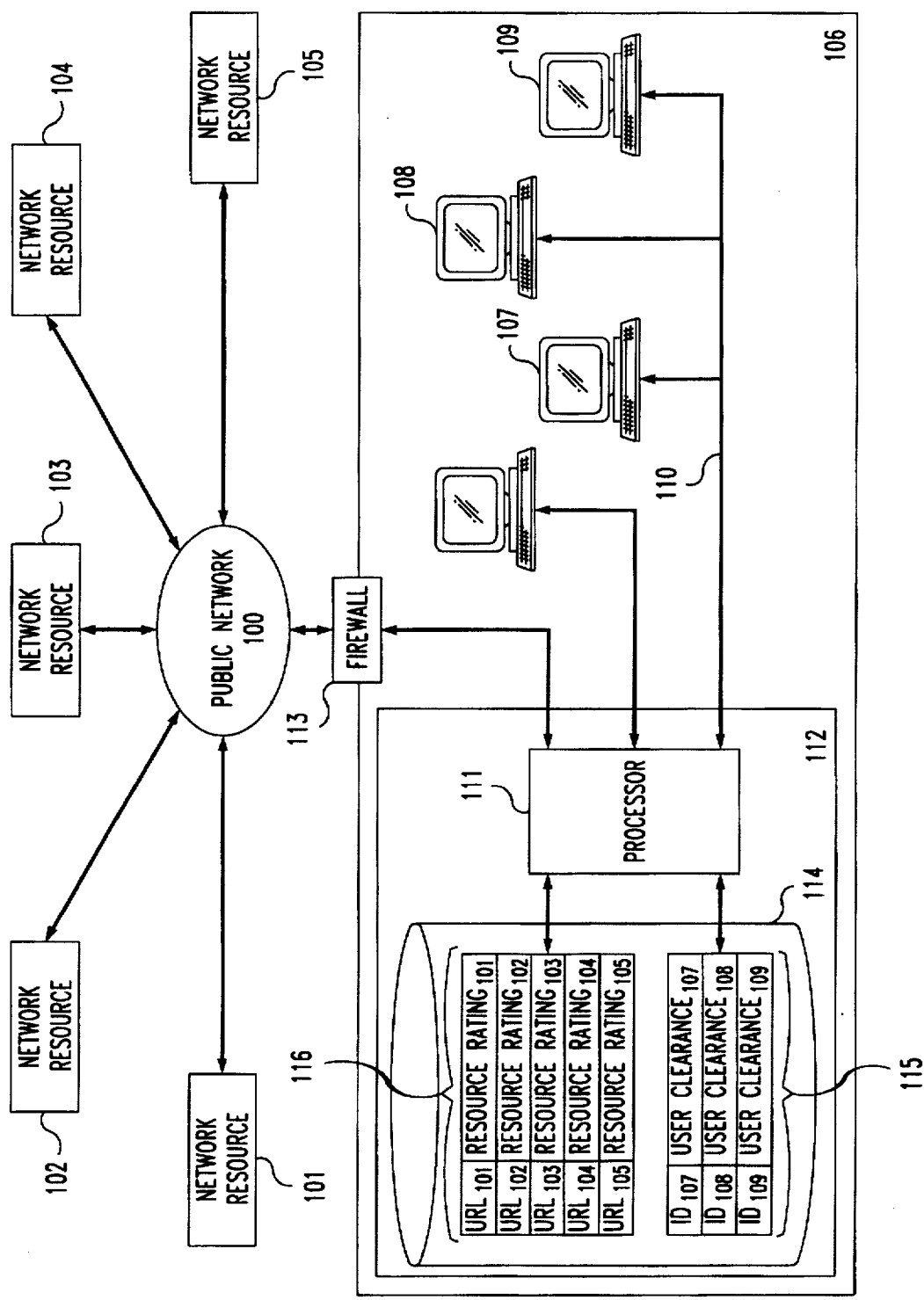
FIG. 1 is a simplified diagram of an exemplary system embodying the invention.

FIG. 1 is a simplified diagram of an exemplary system embodying the invention. A related system is the subject of the co-pending, and commonly assigned U.S. patent application Ser. No. 08/469,342, entitled "System And Method For Database Access Control" which was filed on Jun. 6, 1995. As shown in FIG. 1, the system includes public network 100, network resources 101–105, and user site 106. Particular users at user site 106 gain access to public network 100 via user terminals 107, 108 and 109. Each of these user terminals is linked by local area network ("LAN") 110 to processor 111 within proxy server 112. Finally, proxy server 112 provides a connection from processor 111 to public network 100 via firewall 113.

Requests from user terminals 107–109 for access to network resources (101–105) through public network 100 are submitted to processor 111 within proxy server 112. In this particular embodiment of the invention, the submitted requests are assumed to be in the form of URLs. As is well known in art, when URLs are submitted to a proxy server, the particular requesting user terminal is identified to the proxy server by an identification header attached to the URL. For the system shown in FIG. 1, the identification code for user terminal 107 is $ID_{107}$, the identification code for user terminal 108 is $ID_{108}$, and the identification code for user terminal 109 is $ID_{109}$. In addition, within the system of FIG. 1, URLs designated as $URL_{101}$, $URL_{102}$, $URL_{103}$, $URL_{104}$ and $URL_{105}$, represent requests for information from network resources 101, 102, 103, 104 and 105, respectively.

Upon receipt of an incoming URL, processor 111 is programmed to determine the identity of the requesting user terminal from the URL header. This identification information is then utilized by processor 111 to cross-reference the received URL with information stored in relational database 114. Relational database 114 contains listing 115 which associates each of the user identification codes ($ID_{107}$, $ID_{108}$ and $ID_{109}$) with a user clearance code (user clearances$_{107}$, user clearances$_{108}$ and user clearances$_{109}$, respectively). These user clearances indicate the particular rating class or classes of network resources that a given user terminal is allowed to access (i.e.; unlimited access; restricted use of URLs identified as accessing violent subject matter; restricted use of URLs that are identified as accessing obscene subject matter; etc). Also contained in relational database 114 is listing 116 which includes a register of allowable URLs ($URL_{101-105}$) that may be transmitted from a user terminal to access network resources. Listing 116 associates each of these URLs with a particular resource rating data (resource rating$_{101-105}$). The resource rating associated with each of said URLs can be something as simple as a rating class indicator. For example, an indication that a particular URL is approved for use by all users, or that use of a particular URL is restricted for some reason (i.e.; the URL accesses network resources that contain violent or obscene subject matter).

For example, assume that a system administrator or manager had subjectively categorized the network resources of FIG. 1 into three classes (non-violent—NV, moderately violent—MV, and violent—V) as follows: network resource 101—NV, network resource 102—NV, network resource 103—NV, network resource 104—MV, and network resource 105—V). The URL/resource rating listing 116 would then contain the following data:

| URL | Resource Rating |
| --- | --- |
| $URL_{101}$ | NV |
| $URL_{102}$ | NV |
| $URL_{103}$ | NV |
| $URL_{104}$ | MV |
| $URL_{105}$ | V |

Further assume that user terminal 107 should be allowed access to all network resources (NV, MV and V); that user terminal 108 should only be allowed to access NV and MV rated resources; and that user terminal 109 should be allowed to access only NV resources. Information reflective of these user terminal clearances would be stored within listing in 115 as follows:

| User Identification | User Clearance |
|---|---|
| $ID_{107}$ | NV, MV, V |
| $ID_{108}$ | NV, MV |
| $ID_{109}$ | NV |

Within the system of FIG. 1, when a requesting user terminal transmits a URL via LAN 110, processor 111 receives the URL and the requesting user terminal identification code. Processor 111 then queries listing 115 to determine the allowable resource ratings for the particular requesting user terminal, and listing 116 to determine the resource rating of the network resource that will be accessed by the particular received URL. If a URL requesting network resource 101 was received by processor 111 from user terminal 107, list 115 and 116 within relational database 114 would yield information indicating that user terminal 107 was cleared to access NV, MV and V rated network resources, and that $URL_{101}$ had a rating of NV. As the rating of the requested resource was one of the ratings for which the requesting user terminal had clearance, processor 111 would forward the request for information ($URL_{101}$) to public network 100 via firewall 113. Assuming the requested resource was available, public network returns the requested information to user terminal 107 via firewall 113, processor 111 and LAN 110. Contrastingly, if a URL having a rating that the requesting user terminal is not cleared for is received by processor 111, that request for information is denied. For instance, if $URL_{105}$ is received by processor 111 from user terminal 109, relational database 114 is accessed. Since the data within listings 115 and 116 show that $URL_{105}$ has a rating of V, and that user terminal 109 is cleared to access only NV rated network resources, processor 111 denies the request for information, and no URL is sent to public network 100. Processor 111 could also be programmed to deny all requests from user terminals for un-rated resources. This would prohibit the accessing of network resources that had not been reviewed or rated by the system administrator/ manager. It will also be understood from the above description of the invention that images contained within a given resource (i.e., in-line images) are subject to the same rating given to the resource. There would be no need to rate the in-line images separately.

In the particular embodiment described above, relational database 114 stores a list of user terminal identification codes and the various user clearances reflective of the ratings of network resources that each user terminal should be allowed to retrieve from public network 100. It will be understood that the invention could be modified so that the list of user clearances associated with a given user terminal identification code serves as a restrictive list (i.e.; that user is not allowed to retrieve network resources having that rating). This restrictive listing functionality could be readily facilitated by reprogramming processor 111. In addition, the invention could be modified so that the identification codes recognized by processor 111 and stored in relational database 114 are user specific, as opposed to user terminal specific. In other words, the system of FIG. 1 could be modified so that a given individual using a terminal is identified to the system by a personal password or other identifying code. Access or denial of the transmission of particular URLs is effected by the system as a function of that person's identity, regardless of the particular user terminal they may be utilizing.

Figure 2:
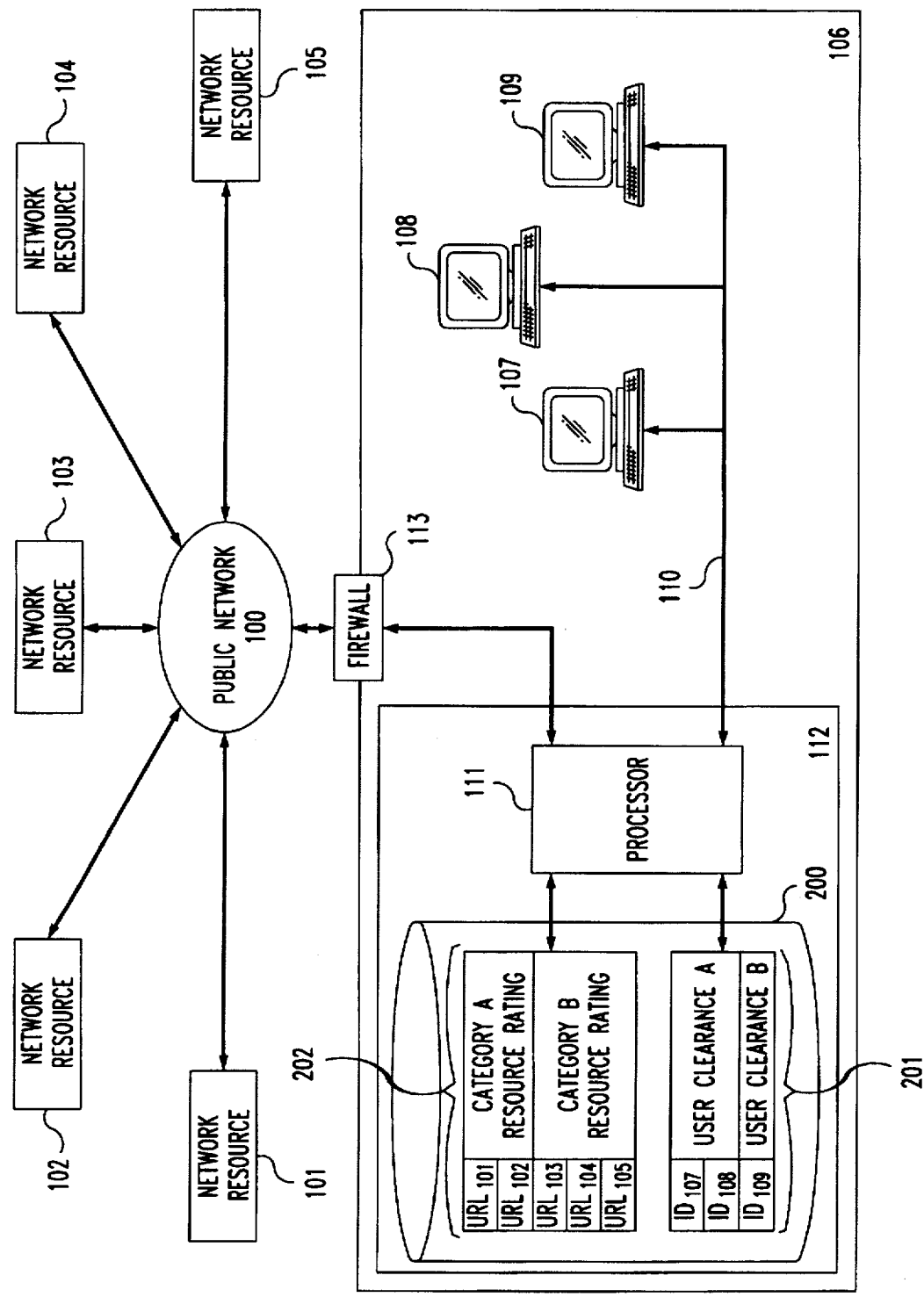
FIG. 2 is a simplified diagram of an alternate arrangement of the system of FIG. 1 adapted to facilitate the classification of URLs into rating groups.

The above described system may also be modified so that URLs are identified as being in a rating category within the memory structure of a relational database. FIG. 2 provides a simplified diagram of a system similar to that of FIG. 1, but adapted to facilitate the classification of URLs into rating groups. As shown, relational database 200 includes user identification code listing 201 and URL listing 202. Listing 201 designates user identification codes $ID_{107}$ and $ID_{108}$ as being in the user clearance A category, and $ID_{109}$ as being in the user clearance B category. Upon receipt of an incoming URL, processor 111 ascertains the identity of the requesting user terminal from the URL header, and then utilizes this identification information to determine the clearance category specified for that particular user within listing 201. The particular URL received by processor 111 is then cross-referenced with listing 202 to determine the associated resource rating category. If the requesting user has a clearance that corresponds to resource rating associated with the requested URL, processor 111 forwards the URL to public network 100 via firewall 113. Public network 100 returns the requested information to the identified user via firewall 113, processor 111 and LAN 110. Contrastingly, if a URL is included in a resource rating category for which the requesting user is not cleared, processor 111 denies the request for information.

In addition, the URL rating data within the above described systems can include a text listing of the rationale upon which a given rating is based, or additional information that facilitates more complex conditional rating schemes. As an illustration of a conditional rating for a URL assume that a the resource rating associated with a particular URL has been rated V for violent, and that all the terminals within a given school have clearances of NV (no violence). Therefore, in general, none of the school terminals would be granted use of the V rated URL. However, situations could arise that require exception to this general rule. For example, a certain terminal associated with a history class could need to access a particular resource that contained violent, but relevant information on an historic military battle. To facilitate access to such resources, the relational database rating information for the military battle resource would be augmented to reflect the conditional rating of "NV for user terminals located in history classrooms; V for all other terminals". With this conditional system, history class terminals would be restricted from all other "violent" rated URLs, but still be capable of accessing historically significant, yet violent, network resources. Conditional access could also be granted to terminals or users a function of time (i.e.; access limited to certain times of day for certain users or user terminals).

Figure 3:
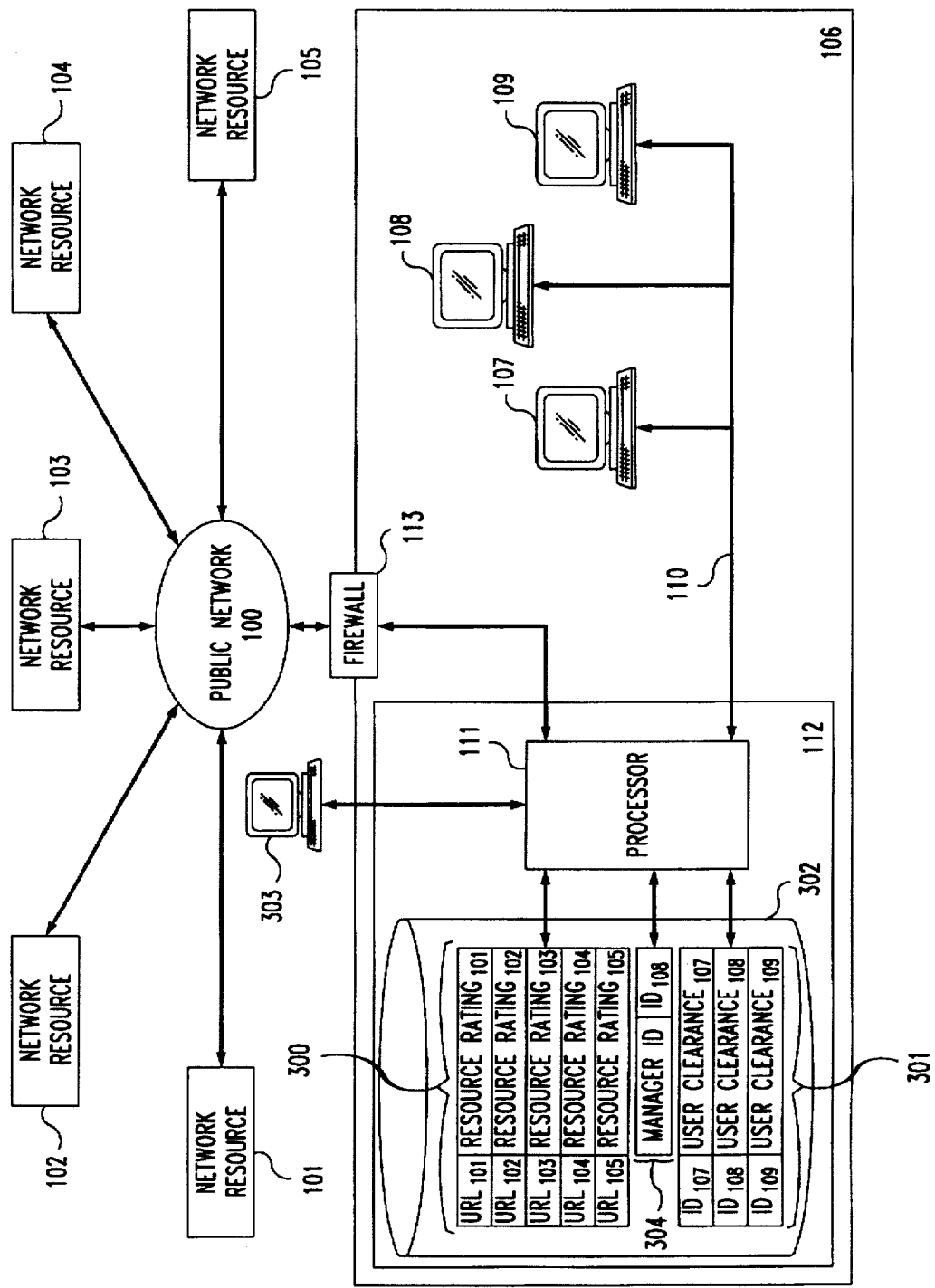
FIG. 3 is a simplified diagram of an alternate arrangement of the system of FIG. 1 including system management adaptations.

As stated above, the relational databases within the systems of FIG. 1 and FIG. 2 contain listings of user/user terminal identification codes and URLs. These listings are subjectively categorized or rated to facilitate the selective access of otherwise public network resources. This categorization/rating was assumed to have been performed by a system manager, and is effected by modifying the contents of the relational database utilized in practicing the invention. Within the system shown in FIG. 3, processor 111 can be programmed to allow resource categorization information (listing 300) and/or user/user terminal clearance information (listing 301) within relational database 302 to be modified only by a specific dedicated management terminal 303. Restricting ability to "write" new information into relational database 302 to management terminal 303 minimizes opportunities for database tampering. Alternately, the system can also be configured to permit database modification to be performed from any one of user terminals 107, 108 or 109. To protect against corruption of the contents of relational database 302, authorization for altering the contents of relational database 302 from a user terminal is controlled via use of a manager identifier. For example, if a system manager wished to modify relational database 302 from user terminal 108, he or she would enter a password identifying themselves as an authorized system manager. The password is received by processor 111 and compared with the contents of manager ID memory listing 304. If the received manager ID password corresponds to one stored in listing 304, then user terminal 108 is identified as a manager terminal (as indicated by $ID_{108}$ being stored within listing 304). Modifications to the contents of relational database 302 may then be effected from that user terminal. When all modifications have been completed, the manager logs off and user terminal 108 returns to standard user terminal status (i.e., $ID_{108}$ is cleared from listing 304).

With the ever increasing proliferation of information systems in home, school and work environments, it is often the case that the responsibility of managing information access falls upon one or more individuals that are less than expert with respect to computer or information systems. Any of the above described systems can be implemented in a manner that allows a non-expert manager to easily control the systems. For example, within the system of FIG. 3, processor 111 can be programmed to provide users recognized as system managers with an HTML "rating header" prior to the lead page of each retrieved network resource. If a manager retrieved the AT&T 800 Directory network resource via public network 100, the returned information would be labeled by processor 111 to reflect a non-violent rating (see FIG. 4, note the "NV" designation that precedes the retrieved resource—the AT&T 800 Directory). The manager may review the reasoning behind the rating by clicking on the portion of the HTML rating page labeled "click here". This results in the retrieval from resource categorization information listing 300 of the rationale upon which the NV rating was based (see the page shown in FIG. 5). If the manager wished to disagree with the assigned rating upon retrieving the AT&T 800 Directory resource, he or she would click on "If you disagree, click here". This retrieves rating and rationale information from resource categorization information listing 300, and provides the manager with a page that facilitates editing of the rating (see FIG. 6). This page provides the manager with the current rating of the resource ("NV"), the main reason it was rated as such ("zero violent content"), and an area for entering a more detailed reason ("The resource consists of telephone listings . . . "). Upon completing, or modifying this HTML page, the system manager would select "Send Message" and thereby transmit the page to relational database 302 for storage within listing 300.

It will be understood that the particular system and method described above is only illustrative of the principles of the present invention, and that various modifications could be made by those skilled in the art without departing from the scope and spirit of the present invention, which is limited only by the claims that follow. For example, any one of the above described embodiments could be modified to accept requests from users/user terminals that are in a format other than a URL. The relational database would merely have to be modified to store sets of information indicative of the particular type of request format being employed, and associated with a particular user class. Yet another modification would involve the adaptation to a multi-manager environment. In such an environment, network resource ratings could be arrived at as a result of voting among a number of system managers. For example, a number of managers could submit or alter a resource's rating, but the ultimate rating stored in the relation database would be an averaging of the submitted ratings, or whatever the majority of the managers chose as the rating of the particular resource. The relational database utilized in systems facilitating the invention could also be configured so that information indicative of allowable resource access is arranged to conform to resources that are configured in a tree structure format (such as a hierarchical directory arrangement). Such a relational database would include a listing of directory and/or subdirectory identifiers that could be labeled with a particular resource rating. The system could be configured so that resources located within a directory or subdirectory so labeled, would assume the rating of the overall directory/subdirectory. Alternatively, the system could employ a prioritized directory/subdirectory rating system. In such a system, a directory would be assigned an overall rating such as "NV". Particular items or subdirectories within this NV rated directory could then be labeled with specific ratings outside of "NV", such as "V". When a user accessed the NV rated directory, all items within it would be assumed to have an NV rating, except those items or subdirectories labeled with some other, more specific and different rating.

The invention claimed is:

1. A system for selectively restricting access to one or more otherwise public information resources, comprising:

a relational database containing a first stored listing that associates each of a plurality of resource identifiers with at least one resource rating, and a second stored listing that associates each of a plurality of user identification codes with at least one user clearance rating;

a processor adapted to receive a request for network access to one or more particular network resources, said request including a resource identifier and a user identification code, said processor being further adapted to query said first and second listings within said relational database, and execute said request for network access to said one or more particular network resources as a function of the resource rating shown to be associated with said received resource identifier within said first listing, and the user clearance rating shown to be associated with said received user identification code within said second listing.

2. The invention of claim 1 wherein at least one of said one or more particular network resources includes at least one image.

3. The invention of claim 1 wherein said processor is programmed to execute said request for access if said resource rating associated with said received resource identifier within said first listing, corresponds to at least one of said user clearance ratings associated with said received user identification code within said second listing.

4. The invention of claim 1 wherein said processor is programmed to deny execution of said request for access if said resource rating associated with said received resource identifier within said first listing, corresponds to at least one of said user clearance ratings associated with said received user identification code within said second listing.

5. The invention of claim 1 wherein said processor is contained within a network proxy server.

6. The invention of claim 1 wherein each of said user identification codes identifies one or more terminals adapted for facilitating network access to one or more particular network resources.

7. The invention of claim 1 wherein each of said user identification codes identifies one or more individuals authorized to access one or more particular network resources.

8. The invention of claim 1 wherein each of said resource identifiers corresponds to one or more uniform resource locators for accessing one or more particular network resources.

9. The invention of claim 1 wherein said relational database further includes a data listing associated with one or more of said plurality of resource identifiers, wherein said data listing represents textual information related to the resource rating shown to be associated with said one or more of said plurality of resource identifiers within said first listing.

10. The invention of claim 1 wherein said relational database further includes a conditional data listing associated with one or more of said resource identifiers, wherein said conditional data listing represents information indicative of specific conditions under which requests for network access to particular network resources associated with said resource identifier can be executed, and wherein said processor is further adapted to execute said request for network access to said one or more particular network resources as a function of said conditional data listing.

11. The invention of claim 1 wherein said relational database further comprises a stored listing of at least one system manager identifier, and said processor is adapted to identify a user as a system manager on the basis of said system manager identifier listing, and thereby permit said identified system manager to modify the contents said relational database.

12. The invention of claim 11 wherein said relational database further comprises a stored listing containing at least one HTML page adapted to facilitate the modification of the contents of said relational database by said identified system manager.

13. A method for selectively restricting access to one or more otherwise public information resources, comprising the steps of:

receiving a request for access to one or more particular information resources, wherein said request includes a user identification code and a resource identifier;

comparing said received request for access to a relational database containing a stored listing of user identification codes and resource identifiers, wherein each of said resource identifiers is associated with at least one resource rating, and wherein each of said user identification codes is associated with at least one user clearance rating;

executing said request for access as a function of the resource rating shown to be associated with said received resource identifier within said stored listing, and the user clearance rating shown to be associated with said received user identification code within said stored listing.

14. The method of claim 13 wherein at least one of said one or more particular network resources includes at least one image.

15. The method of claim 13 wherein the execution of said request for access is performed if said stored listing shows said received user identification code to be associated with at least one user clearance corresponding to at least one resource rating shown to be associated with said one or more particular network resources.

16. The method of claim 13 wherein the execution of said request for access is denied if said stored listing shows said received user identification code to be associated with at least one user clearance corresponding to at least one resource rating shown to be associated with said one or more particular network resources.

17. The method of claim 13 wherein each of said user identification codes identifies one or more terminals adapted for facilitating network access to one or more particular network resources.

18. The method of claim 13 wherein each of said user identification codes identifies one or more individuals authorized to access one or more particular network resources.

19. The method of claim 13 wherein each of said resource identifiers corresponds to one or more uniform resource locators for accessing said one or more particular network resources.

20. The method of claim 13 further comprising the step of providing a user with access to a data listing within said relational database, wherein said data listing is associated with one or more of said plurality of resource identifiers, and wherein said data listing represents textual information related to the resource rating shown to be associated with said one or more of said plurality of resource identifiers within said stored listing.

21. The method of claim 13 wherein said relational database further comprises a stored listing of at least one system manager identifier, and said processor is adapted to identify a user as a system manager on the basis of said system manager identifier listing, and thereby permit said identified system manager to modify the contents said relational database.

22. The invention of claim 1 wherein said plurality of resource identifiers associated with at least one resource rating are arranged in a hierarchical directory data structure.

23. The invention of claim 22 wherein said plurality of resource identifiers arranged in said hierarchical directory data structure are associated with more than one resource rating.

* * * * *